United States Patent [19]

Takada

[11] 4,165,100
[45] Aug. 21, 1979

[54] SAFETY BELT APPLYING SYSTEM

[75] Inventor: Juichiro Takada, Shin'machi, Japan

[73] Assignee: Takata Kojyo Co., Ltd., Tokyo, Japan

[21] Appl. No.: 849,390

[22] Filed: Nov. 8, 1977

[51] Int. Cl.² ........................................... B60R 21/10
[52] U.S. Cl. .................................................. 280/802
[58] Field of Search ............... 280/744, 745; 297/388, 297/389

[56] References Cited

U.S. PATENT DOCUMENTS

| | | | |
|---|---|---|---|
| 3,684,310 | 8/1972 | Weststrate | 280/745 |
| 3,827,714 | 8/1974 | Lefeuvre | 280/745 |
| 3,831,974 | 8/1974 | Keppel | 280/745 |
| 3,905,614 | 9/1975 | Lindblad | 280/745 |
| 3,915,473 | 10/1975 | Lindblad | 280/745 |

*Primary Examiner*—Joseph F. Peters, Jr.
*Assistant Examiner*—Norman L. Stack, Jr.

*Attorney, Agent, or Firm*—Wolder, Gross & Yavner

[57] ABSTRACT

A mechanism for automatically applying a three-point waist and shoulder belt to a vehicle seat occupant includes a first belt guide slideable along a track on the vehicle door in an inclined direction and a second belt guide connected at one end to a retractor belt which is connected to an inertia responsive belt retractor at the side of the seat opposite the door, a continuous shoulder and waist seat belt has a first end anchored to the upper free corner of the door and extends successively through the second and first belt guides and has its second end anchored to the lower free corner of the door. The belt first end may be buckle-coupled to the door and the first belt guide may be strap-connected to a track-engaging slide. A motor and control network are provided but downwardly advancing the first guide along the track with the occupant of the seat for the closing of the door and for retracting the first guide with the subsequent opening of the door.

8 Claims, 5 Drawing Figures

SAFETY BELT APPLYING SYSTEM

The present invention relates to an improved safety seat belt device for protecting seat occupants in vehicles such as automobiles. In case of an emergency such as a collision of a vehicle, the seat occupant may suffer serious injury if he should fail to wear a seat belt. Most tragedies would be avoided if the seat occupant correctly used the safety seat belt. However, in spite of the provision of safety seat belts in vehicles, only a few of the seat occupants attempt to use the seat belts because of inconvenient application operation. In order to overcome this problem, various types of safety seat belt devices have been proposed which can be passively fitted, i.e. without requiring troublesome application operations.

However, these proposed safety belts are designed chiefly with a complicated automatic fitting mechanism and are uncomfortable during the application operation and use.

Under these circumstances, the present invention aims at providing a simplified safety seat belt device which is highly safe and comfortable to use, as a result of a series of intensive experiments and studies concerning the strength of the seat belt retaining portion, impact load at collision and other factors. The safety seat belt device of the invention can be without any troublesome application operation, passively applied as the occupant is seated, at a moderate tightness to ensure a good feel during use, avoiding a pressing on the occupant body due to the retracting force exerted by the retracting means. In addition, the belt can be loosened to allow the occupant escape from the vehicle, by an independent manual release means, in case of emergency, such as turning sideways.

Hereinafter, a preferred embodiment of the invention will be described with specific reference to the accompanying drawings, in which.

Figure 1:
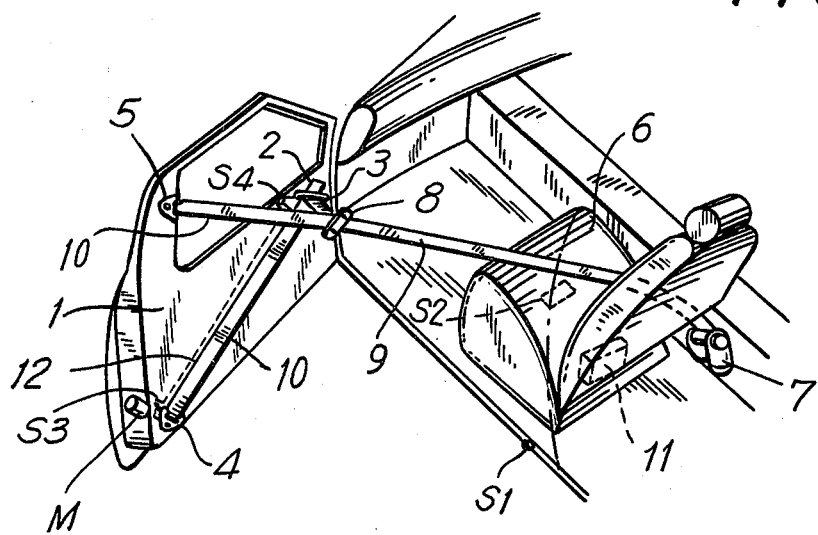
FIG. 1 is a perspective view of an automatic safety belt applying mechanism embodying the present invention shown with the vehicle door in open position.
Figure 2:
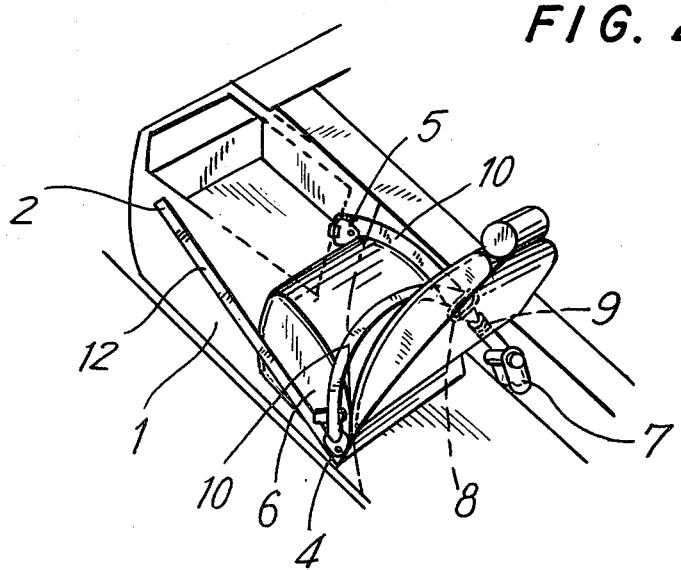
FIG. 2 is a view similar to FIG. 1 but with the vehicle door in closed position.

Referring now to FIGS. 1 and 2 of the drawings, a known slide rail means 2 including a rail 12, a motor M, a stop switch S3, a reverse-stop switch S4 etc. are installed in a door 1 of the vehicle, at the inner side of the door 1. The slide rail means 12 as a whole is installed in such an inclination that its front end is high and the rear end is low. A through or guide member 3 is adapted to run along the rail 12 in accordance with the operation of later described electric circuit means 11. A continuous belt 10 slideably passes through the through member 3. The rear end of the slide rail means 2 inwardly of the lower portion of the free end of the door 1 is suitably reinforced so as to withstand a possible impacting load at collision which may be applied through the seat belt. A lower fixture or anchor member 4 is secured to this reinforced portion of the door 1. Similarly, an upper or anchor fixture member 5 is secured to the door 1 at a portion of the latter around the upper corner of the free end. An emergency-locking retracting means 7 which is adapted to allow free extraction and retraction of a seat belt is provided at opposite side of a seat 6 from the sliding rail means 2, and is suitably fixed to the central portion of the floor of the vehicle cabin, or to the side of the seat 6.

A guiding slideable branch member 8 having a slot for slideably receiving a seat belt is connected to one end of a retractable member 9 which is a part of a lap belt, while the other end of the retractable member 9 is fixed to the retracting means 7.

As will be clearly seen from FIG. 2, a continuous belt 10 has a continuous main part of waist restraining and shoulder restraining portions. The continuous belt is fixed at its one end to the lower fixture member 4 by sewing or in an adjustable manner, and passes through the through member 3 and the slideable branch member 8, so as to be fixed at its other end to the upper fixture member 5.

The lengths of the continuous belt 10, retractable member 9 and the slide rail means 2 are so selected that the distance between the through member 3 and the slideable branch member 8 is shortened as the door 1 is opened, and that the slideable branch member 8 comes in the vicinity of the waist of the occupant, as will be seen from FIGS. 1 and 2.

A door switch S1 which is operated in response to opening and closing of the door 1 is secured to the door 1 or to a suitable portion of the vehicle floor, while a seat switch S2 which is operated in response to occupant's taking a seat is provided in the seat 6.

An electric circuit means 11 consists of a stop switch S3, reverse stop switch S4, a timer T1, relays R1 and R2 and so on which are installed within the slide rail means 2. The wiring of the electric circuit means 11 is made at a suitable position, such as the inside of the seat 6.

Figure 3:
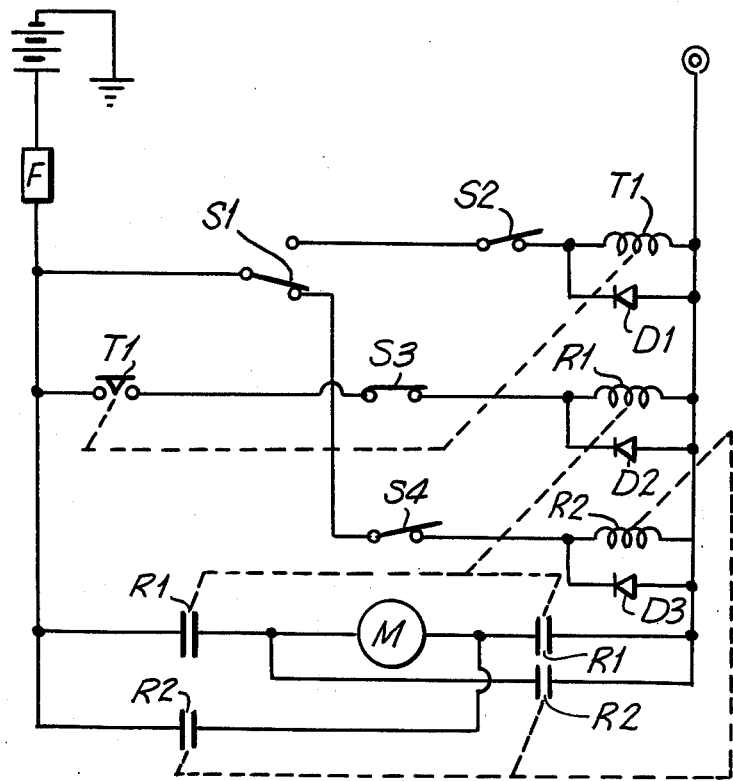
FIG. 3 is a circuit diagram of the associated control network.

Hereinafter, the operation of the first embodiment of the invention will be described with reference to FIG. 3, which shows an example of an electric circuit of the passively restraining protective device of the invention.

When the door 1 is kept opened, the stop switch S3 located beneath the slide rail means 2 is closed, while the reverse stop switch S4 is opened. As the same time, the through member 3 is stationed at the uppermost portion of the slide rail means 2, so the distance between the through member 3 and the slideable branch member 8 is made short due to the constant length of the continuous belt 10.

The continuous belt 10 is pulled, along with the slideable branch member 8, toward the retracting means 7. Consequently, the portion of the continuous belt between the upper fixture member 5 and the slideable branch member 8 and the retractable member 9 are greatly reflexed each other to provide a clearance to allow the occupant to be seated on the seat 6. In this state, in which the door 1 is opened, the door switch S1 and the seat switch S2 are both opened but the seat switch S2 is closed as the occupant is seated. In this state, since the door switch S1 is kept still opened, electric current does not flow through the electric circuit.

Then, as the door 1 is closed, the door switch S1 is closed to complete the upper side circuit, so that an electric current is allowed to flow through the circuit of the seat switch S2 and energizes the timer T1. After an elapse of a time set by the timer T1, typically two seconds or so, a relay coil is energized through the normal run stop switch S3 provided beneath the slide rail means 2, so as to close a normal running relay switch contact R1. Consequently, the motor M is energized to cause normal running (descending) of the through member 3. Consequently, the continuous strap 10 becomes slack, but this slack is retracted by the retracting means 7 through the slideable branch member 8 and the retractable member 9. Then, the continuous belt 10 is fitted such that the slideable branch member 8 occupies a position along the waist as shown in FIG. 2.

Since the retracting means 7 is of the emergency locking type, the belt maintains a good fit around the occupant's body during normal use, and is locked by the retracting means 7 only in case of emergency such as collision, thereby to restrain the occupant's body during the use, and is locked by the retracting means 7 only in case of emergency such as collision, thereby to restrain the occupant's body. At the same time, the switch S4 is closed due to the descending of the through member 3. Subsequently, as the through member reaches the lowermost position, the stop switch S3 is opened to deenergize the motor and stop the operation of the through member 3. Then, as the door 1 is opened, the door switch S1 comes to close the reversing circuit, including the reverse stop switch S4 so as to cause a reversing of the motor M, so that the through member 3 is reversed (ascends) to allow a clearance for the occupant to get out of the automobile.

Figure 4:
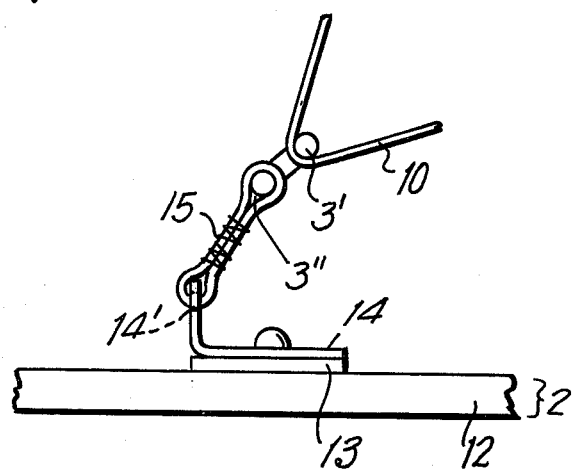
FIG. 4 is a fragmentary plan view of a component of another embodiment of the present invention.
Figure 5:
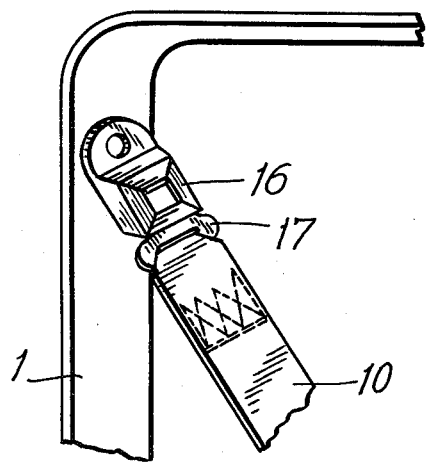
FIG. 5 is an elevational view of another component view thereof.

Considering now the second embodiment of the invention, FIG. 4 shows a mechanism for retaining a through member 3' of the second embodiment, while FIG. 5 shows a mechanism for retaining the belt of the second embodiment at the upper portion of the door.

The construction of the safety seat belt as a whole is almost the same as that of the first embodiment. However, there are some points in which this second embodiment differs from the first embodiment. The mechanism for retaining the through member 3' is modified as shown in FIG. 4 and the upper fixture member 5 of the first embodiment is substituted by a retaining construction as shown in FIG. 5. Further, a known tensionless emergency locking retracting means [not shown] which can allow a free adjustment of tightness after fitting and stop the taking up, is used in place of the conventional emergency locking retracting means 7 of FIG. 1. The through member 3' is provided with a projection 3" for preserving the angle of this member and an elongated circular or arcuate slot. A slide member 13 is provided for sliding movement along the rail 12. A bracket 14 is fixed to the slide member 13 and is bent at a suitable angle. A belt receiving bore 14' is formed in the bent end of the bracket 14. The through member 3' is connected to the bracket 14 through a belt 15 consisting of a flexible material such as web. At the same time, as shown in FIG. 5, a retaining means 16 such as a buckle is secured to or built in the upper portion of the free end of the door 1. The upper end of the continuous strap is sewed to a retaining member or buckle coupling tongue 17 of the retaining means 16.

In operation, during the fitting operation of the belt, the through member 3' is held by the flexible belt 15, so that the continuous belt 10 is not extracted in improper direction through the slideable branch member 8. In addition, due to the adoption of the emergency locking retracting means 7', the shoulder of the occupant is never pressed by the belt. In addition to the release of the safety seat belt by the opening of the door, the belt can be disengaged manually, through disengaging the retaining means 16 by hand.

To sum up the advantageous effect of the invention, the major portion of waist and shoulder retaining portions of the safety belt is constituted by a continuous strap, while a remaining portion of the waist restraining portion is constituted by a retractable member through which the continuous strap is taken up by a reracting means installed at the center of the vehicle, so that the safety belt can be fitted irrespective of the occupant's will safely and automatically. In addition, the retaining mechanism for the safety strap and slideable portion of the safety belt does not cause discomfort to the seat occupant, while performing a highly desirable safety function.

While there have been described and illustrated preferred embodiments of the present invention, it is apparent that numerous alterations, omissions and additions may be made without departing from the spirit thereof.

I claim:

1. In a vehicle including a door swingable about its front end between open and closed positions and an adjacent seat, a safety belt seat system comprising a belt retractor disposed at the side of said seat opposite to said door, a retractor belt retractable by said retractor, a first belt belt guide carried by said retractor belt, a second belt guide mounted on said door and movable along an inclined path from the inner portion thereof downwardly toward the outer portion thereof, a continuous shoulder and waist restraint belt having a first end anchored to said door proximate the upper outer portion thereof and extending therefrom successively through said first and second belt guide and having its other end anchored to said door proximate the lower outer portion thereof, and means including a motor carried by said door and means for activating said motor in response to the closing of said door for advancing said second belt guide from the upper to the lower end of said path and in response to the opening of said door to retract said second belt guide from the lower to the upper part of the said path.

2. The safety belt system of claim 1 including means for deactivating said motor in response to the unoccupation of said seat and the closed condition of said door.

3. The safety belt system of claim 1 including a track extending along said path, said second belt guide being slideable along said track.

4. The safety belt system of claim 3 comprising a slide member slideable along said track said second guide member being carried by said slide member and being angularly movable thereon.

5. The safety belt system of claim 3 including a separable coupling assembly releasably anchoring said restraining belt first end to said door.

6. The safety belt system of claim 1 wherein said retractor is of the inertia automatic locking type.

7. An automatic restraining protection device for a vehicle seat occupant comprising slide rail means (2) installed at a certain inclination within a door (1) of said vehicle, a through member (3) adapted to move along an inclined path provided by a rail (12) laid on said slide means, a lower fixture member (4) secured to the lower end portion of the free end of said door (1), an upper fixture member 5 secured to the upper end portion of the free end of said door (1), retracting means (7) fixed to the floor or the like of the vehicle cabin, a retractable member (9) secured at one end to said emergency-locking retracting means (7) and carrying a slideable branch member (8) at its other end, a continuous belt (10) having continuous waist and shoulder restraining portions, said continuous belt (10) being fixed at its one end to said lower fixture member (4) and extending through said through member (3) and said slideable branch member (8) so as to be connected at its other end to said upper fixture member (5) an electric motor (M) carried by said door and drive connected to said through member, and electric circuit means (11) including a door actuated switch (S1) whereby said electric circuit means are actuated as said door (1) is closed to energize said motor to cause the downward movement of said through member along said rail to a predetermined first position, so as to allow said retractable member (9) and said continuous belt (10) to be moved to restraining position by the force of said retracting means (7) and as said door (1) is opened to energize said motor to cause the upward movement along said rail to a predetermined second position.

8. An automatic restraining protection device for vehicle seat occupant comprising slide rail means (2) installed at a certain inclination within a door (1) of said vehicle, a through member 3' movably fixed through a belt (15) or the like to a bracket (14) fixed to a slider (13) adapted to move along an inclined rail (12) laid on said slide rail means, a lower fixture member (4) secured to the lower end portion of the free end of said door (1), retaining means (16) such as a buckle secured to or installed in the upper end portion of the free end of said door (1), tensionless emergency-locking retracting means (7') secured to the central portion of the floor or the like of the vehicle cabin, retractable member (9) secured at its one end to said retracting means (7') and carrying at its other end slideable branch member 8, a continuous belt (10) having continuous waist and shoulder restraining portions, said continuous belt (10) being secured at its one end to a retaining member (17) engaging said retaining means (16) and passing through said slideable branch member (8) and through said through member so as to be secured at its other end to said lower fixture member 4, an electric motor (M) carried by said door and drive connected to said through member, and electric circuit means (11) including a door switch (S1) and a seat switch (S2), whereby said motor (M) is energized to move said slider (13) downwardly along said rail to a predetermined first position so that said continuous belt (10) and said retractable member (9) are comfortably fitted around said occupant automatically by the closing of said door (1) and seating of said occupant, while said retaining means (16) being disengageable even when said door (1) is closed, so as to allow said occupant to be released from said continuous belt (10) in case of emergency, and said motor (M) is energized to move said slider upwardly along said rail to a predetermined second position when said door is opened.

* * * * *